(No Model.)

H. E. WILFORD & J. T. CLARKSON.
CARRIAGE.

No. 534,936. Patented Feb. 26, 1895.

Witnesses:
Walter E. Lombard.
J. D. Thomson

Inventors,
Hubert E. Wilford
Joseph T. Clarkson
per J. W. Porter  Atty

UNITED STATES PATENT OFFICE.

HERBERT E. WILFORD AND JOSEPH T. CLARKSON, OF AMESBURY, MASSACHUSETTS.

CARRIAGE.

SPECIFICATION forming part of Letters Patent No. 534,936, dated February 26, 1895.

Application filed November 1, 1894. Serial No. 527,623. (No model.)

*To all whom it may concern:*

Be it known that we, HERBERT E. WILFORD and JOSEPH T. CLARKSON, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
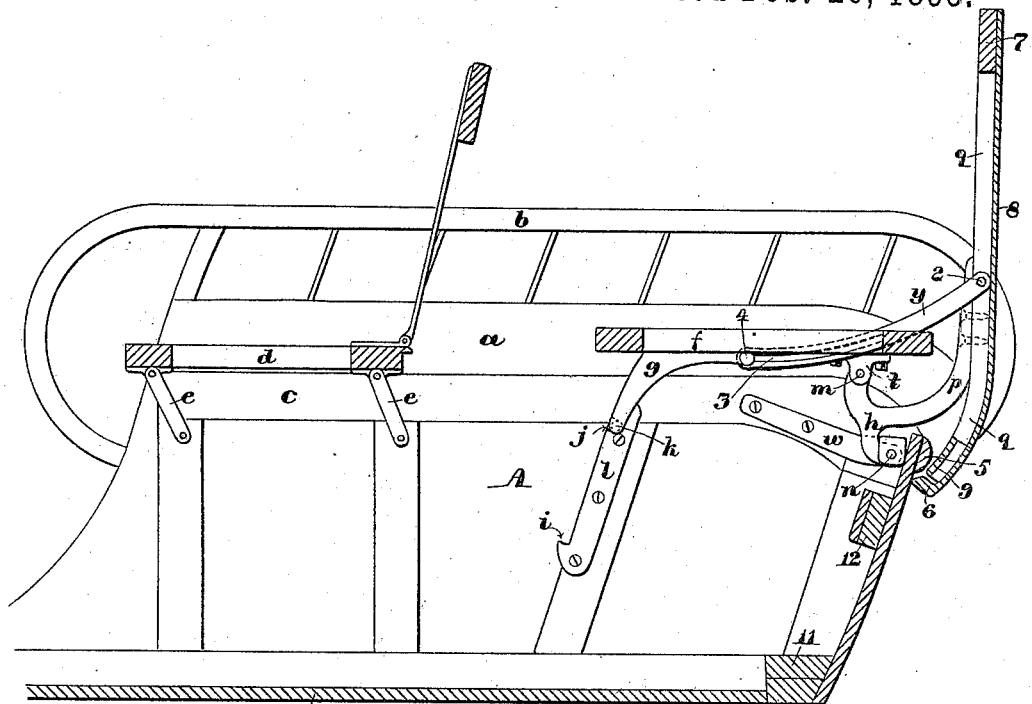
Figure 2:
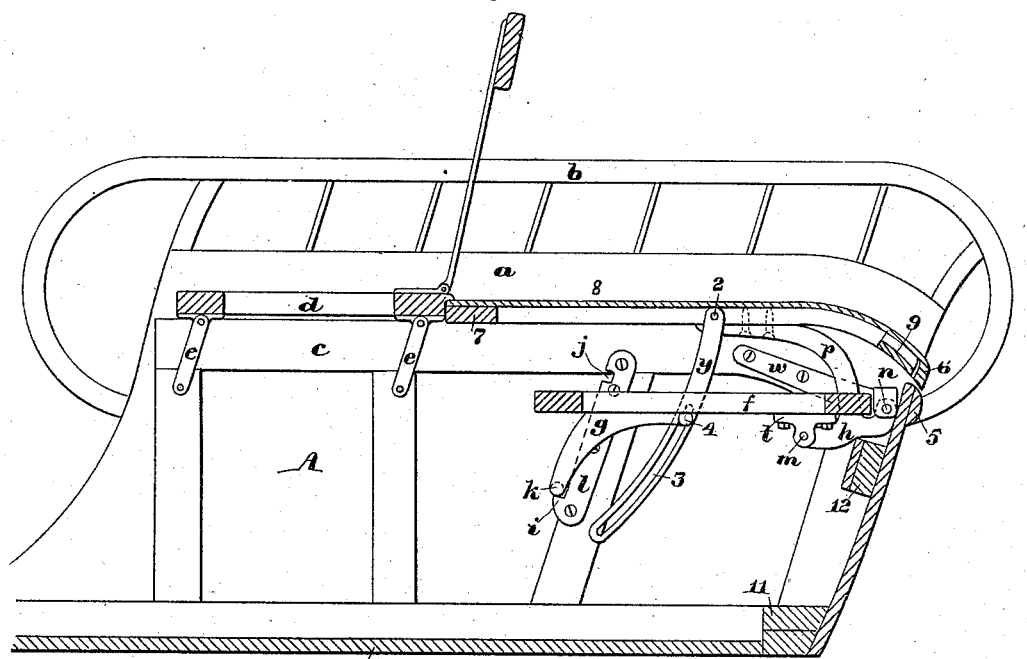

In said drawings: Figure 1 is sectional elevation of a carriage body and seats embodying our invention: the section being vertical and longitudinal and the view from the left or "near" side of the vehicle, and the rear seat being shown as raised into position for use, with the front seat jumped forward to give room for the occupants of the rear seat. Fig. 2 is a view like Fig. 1, except that the rear seat back is turned down and the seat thereby lowered out of use, and the front seat is jumped to its rearward position so as to be used as the sole seat of the vehicle.

The object of this invention is to provide a carriage that can be adjusted for use with either one or two seats: in which the front seat may be jumped back and forth as the rear seat is in or out of use; and a rear seat of peculiar construction and peculiarly attached to the body so that when the rear seat back is raised its seat is supported in position for use, while when said back is turned down the rear seat is by said act lowered beneath the back and is out of the way within the body; and the invention consists in the respective parts, and the combinations thereof, by which the rear seat and back are attached in place, and by which said seat and back are raised into position and are lowered out of position for use: all as will be hereinafter described and pointed out in the claims.

Referring to said drawings again, A represents the body, the front portion being broken away. This body may be of any desired style or pattern that is adapted to our invention: and it is shown as having a narrow panel $a$ somewhat above the side bar $c$; and a side rail $b$ may also be employed. The front seat is shown at $d$ and as connected to the body by jumping irons $e\,e$ in a common and well known manner, so as to be jumped forward as in Fig. 1 or to rear as in Fig. 2, when the rear seat is turned down.

The rear seat is shown at $f$ and it is provided with the supporting angle irons $g$ and $h$. Said angle iron $g$ is fastened rigidly to the front part of said seat $f$, and at its lower end is formed with a stud $k$ that when the seat is lowered, as in Fig. 2, rests on lip $i$ of iron $l$ secured to the side of the body: and when said seat is raised said stud rests in seat $j$ formed in said iron $l$.

The rear portion of seat $f$ is supported by iron $h$ that at its front part is pivoted at $m$ to ear $t$ secured to said seat, and its rear end is pivoted at $n$ to iron $w$ secured to the body: while an arm $p$ of iron $h$ rises above the same and is rigidly secured to back $q$ of said seat. A link $y$ is pivoted at 2 to said back $q$, while in its forward part is formed slot 3 in which is secured stud 4 at the rear end of iron $g$. Said back $q$ is supported by being secured to arm $p$ of iron $h$, and its lower curved end 6 moves in close proximity to and around the half roll 5 secured to the rear part of the body. It will be obvious that when back $q$ is turned down seat $f$ will be moved to the position shown in Fig. 2, and that when said back is raised into position for use, as in Fig. 1, the seat will be thereby raised to the position shown in Fig. 1 ready for use. As each side of our body and seat are duplicates, each of the other and as the cross bars 7 and 9 of the rear seat, as also its joint 8, extend from side to side; as does also the floor 10 rear end sill 11 and back cross bar 12 of the body, we therefore do not deem it requisite to show further views of the carriage.

Having thus described and shown our invention, what we claim as new, and desire to secure by Letters Patent, is—

1. The combination of seat $f$, iron $h$ pivoted to said seat at $m$ and to the body at $n$, an arm $p$ of said iron $h$ extended up and secured to back $q$, a slotted link $y$ secured at one end to back $q$ and at the other to stud 4, and iron $g$ carrying stud $k$, with iron $l$ secured to the body A, and formed at top with seat $j$ and at bottom with lip $i$, substantially as specified.

2. In a carriage, a rear seat back supported by arm $p$ rising from part $h$ pivoted to the body and rear seat, and by link $y$ pivoted to said back and formed with a slot by which it is connected with said seat, substantially as specified.

3. In combination with body A seat $f$ and back $q$, the hinge $h$, pivoted to said body at $n$, to the seat at $m$ and connected with said back as at $p$, all substantially as specified.

HERBERT E. WILFORD.
JOSEPH T. CLARKSON.

Witnesses:
GEORGE H. BRIGGS,
CECILE PENDER.